United States Patent
Sun et al.

(10) Patent No.: US 10,836,909 B2
(45) Date of Patent: Nov. 17, 2020

(54) BLENDS OF POLYESTERS AND PHOSPHONATE OLIGOMERS AND POLYMERS

(71) Applicant: FRX POLYMERS, INC., Chelmsford, MA (US)

(72) Inventors: Xiudong Sun, Weston, MA (US); Youmi Jeong, Boxborough, MA (US); Peter Louvaris, Lynn, MA (US)

(73) Assignee: FRX POLYMERS, INC., Chelmsford, MA (US)

( * ) Notice: Subject to any disclaimer, the term of this patent is extended or adjusted under 35 U.S.C. 154(b) by 0 days.

(21) Appl. No.: 16/162,084

(22) Filed: Oct. 16, 2018

(65) Prior Publication Data

US 2019/0112477 A1 Apr. 18, 2019

Related U.S. Application Data

(60) Provisional application No. 62/572,636, filed on Oct. 16, 2017.

(51) Int. Cl.

| | |
|---|---|
| *C08L 85/02* | (2006.01) |
| *C08L 67/02* | (2006.01) |
| *C08J 3/24* | (2006.01) |
| *C08J 5/18* | (2006.01) |
| *C08J 3/00* | (2006.01) |
| *C08G 63/692* | (2006.01) |

(52) U.S. Cl.
CPC .......... *C08L 85/02* (2013.01); *C08G 63/6926* (2013.01); *C08J 3/005* (2013.01); *C08J 3/246* (2013.01); *C08J 5/18* (2013.01); *C08L 67/02* (2013.01); *C08J 2367/02* (2013.01); *C08J 2385/02* (2013.01); *C08J 2467/02* (2013.01); *C08J 2485/02* (2013.01); *C08L 2203/12* (2013.01); *C08L 2203/16* (2013.01); *C08L 2205/025* (2013.01); *C08L 2205/03* (2013.01); *C08L 2207/20* (2013.01); *C08L 2312/00* (2013.01)

(58) Field of Classification Search
USPC .......................................................... 524/301
See application file for complete search history.

(56) References Cited

U.S. PATENT DOCUMENTS

| | | | |
|---|---|---|---|
| 5,352,401 | A | 10/1994 | Dalgewicz, III et al. |
| 9,523,000 | B2 | 12/2016 | Kawasaki et al. |
| 2007/0149756 | A1 | 6/2007 | Kulkarni |
| 2010/0222486 | A1 | 9/2010 | Matsuno et al. |
| 2015/0284586 | A1 | 10/2015 | Economy et al. |
| 2017/0260389 | A1 | 9/2017 | Kagumba et al. |

FOREIGN PATENT DOCUMENTS

| | | |
|---|---|---|
| WO | 2007072067 A2 | 6/2007 |
| WO | 2017098926 A1 | 6/2017 |

OTHER PUBLICATIONS

Cardena-Vazquez et al., Synthesis and Characterization of Isophthalic Polyesters and Copolyesters based on 2,4-Dihydroxybenzophenone and 4,4' (hexafluoroisopropylidene)diphenol, High Performance Polymers (2010), 22:184-197.

Arya et al., A Divergent, Solid-Phase Approach to Dendritic Ligands on Beads, Heterogeneous Catalysis for Hydroformylation Reactions, Journal of Organic Chemistry (2000), 65:1881-1885.

Smith et al., Melittin-induced changes in lipid multilayers, A solid-state NMR study, Biophysical Journal (Aug. 1992), 63:469-474.

International Search Report and Written Opinion issued for PCT/US2018/056118, dated Dec. 11, 2018.

*Primary Examiner* — Terressa Boykin (74) *Attorney, Agent, or Firm* — Troutman Pepper Hamilton Sanders LLP (57) ABSTRACT

This disclosure relates to polymer compositions comprising blends of polyesters and phosphonate oligomers or polymers as well as methods of making them and articles of manufacture made from such blends.

32 Claims, 5 Drawing Sheets

BLENDS OF POLYESTERS AND PHOSPHONATE OLIGOMERS AND POLYMERS

FIELD

This disclosure relates to polymer compositions comprising blends of polyesters and phosphonate oligomers or polymers as well as methods of making them and articles of manufacture made from such blends.

BACKGROUND

Polyester can be characterized by their intrinsic viscosity (IV). The longer the polymer chains the more entanglements between chains and therefore the higher the viscosity. When a polyester is thermally processed (extrusion into pellets, films, or sheets, spinning into fibers, or injection molding), there is reduction in IV. When polyesters that contain additives that initiate molecular weight loss are processed, the IV loss may be even bigger. To rebuild the IV, chain extenders can be added, which can deteriorate certain properties of the products, or cumbersome solid-state polymerization (SSP) of the final polyester composition is required.

For many applications, polyesters need to be made flame retardant. This is typically done by using small molecular weight flame retardants (FRs). They may migrate out of the polymer matrix over time and end up in the environment. This would also lead to loss of the FR efficacy. Phosphonate oligomers and polymers have been developed that are very effective in providing FR properties to polyesters. These phosphonate materials have the advantage over traditional FRs that they are higher molecular weight materials and therefore are permanently embedded in the polymer matrix. Surprisingly, it was found that these phosphonate oligomers and polymers can react with polyesters, thereby increasing the IV of the resulting blends, to values even higher than the IV of the original polyesters. Thus, in addition to giving FR properties, the use of phosphonate oligomers and polymers further can increase the IV of the blends, which can lead to improved processing of the materials and improved other properties as well (mechanical, optical).

SUMMARY

Some embodiments provide polymer compositions comprising a blend of a phosphonate oligomer or polymer; and a polyester which chemically reacts with the phosphonate compound.

In some embodiments, the polymer composition comprising more than 30 wt % of the phosphonate compound has a maximum no sintering temperature (MNST) of at least about 120° C. In some embodiments, the polymer composition comprising more than 30 wt % of the phosphonate compound has a MNST of at least about 150° C. In some embodiments, the blend further comprises a second polyester, wherein the second polyester does not chemically react with the phosphonate compound within the residence time of the thermal processing step. In some embodiments, the phosphonate compound comprises greater than about 2 wt % of the polymer composition. In some embodiments, the phosphonate compound comprises greater than about 12 wt % of the polymer composition. In some embodiments, the phosphonate compound comprises greater than about 30 wt % of the polymer composition. In some embodiments, the polyphosphonate compound comprises greater than about 40 wt % of the polymer composition.

In some embodiments, the first polyester has an IV of about 0.6 to about 0.9 and a crystallization temperature Tc, as measured during cooling at 40° C./min, of greater than 150° C. In some embodiments, the first polyester comprises at least about 3% weight of the composition. In some embodiments, the first polyester comprises at least about 1 wt % of the polymer composition. In some embodiments, the polymer composition has a higher viscosity that the expected average viscosity of all polyesters in the blend. In some embodiments, the polymer composition is transparent and has a lower haze than a transparent blend of a phosphonate oligomer or polymer and a polyester that does not chemically react with the phosphonate component.

In some embodiments, the 13C-NMR spectrum shows a peak at 121 ppm with an integrated peak area greater than about 0.1 when the peak at 128 ppm is set at 100. In some embodiments, the peaks at 24 to 28 ppm, characteristic for the aromatic phosphonate structure in the $^{31}$P NMR spectrum, are reduced to less than 99% of the peak of the original phosphonate compound. In some embodiments, peaks that appear in the range of 38 to 60 ppm of the $^{31}$P NMR spectrum and that are representing the phosphonate chain ends that are chemically attached to a carbonyl or a hydroxyl group of the polyester are more than 1%.

Some embodiments provide polymer compositions comprising a blend of a phosphonate oligomer or polymer; and a polyester that does not chemically reacts with the phosphonate compound within the residence time of the plastic processing step and an additive that initiates the chemical reaction between the phosphonate compound and the polyester within the residence time of the plastic processing step.

In some embodiments, the phosphonate compound has the formula:

wherein:
Ar is an aromatic group;
X is a $C_{1-20}$ alkyl, $C_{2-20}$ alkene, $C_{2-20}$ alkyne, $C_{5-20}$ cycloalkyl, or $C_{6-20}$ aryl; and
n is in a range from about 2 to about 100.

In some embodiments, the phosphonate oligomer or polymer has the formula:

Some embodiments provide a method for making a polymer blend comprising mixing >30 wt % of a phosphonate oligomer or polymer with a first polyester, wherein the polyester chemically reacts with the phosphonate oligomer or polymer within the residence time of the plastic processing step; subjecting the blend to a compounder; and heating the blend to a temperature of about 200° C. to about 300° C., wherein the blend has a sintering temperature of at least about 120° C. In some embodiments, the mixing of the phosphonate compound with the first polyester further comprises mixing with a second polyester wherein the second polyester does not chemically react with the phosphonate compound within the residence time of the plastic processing step. Some embodiments provide a method for making a polymer blend comprising mixing >30 wt % of a phosphonate oligomer or polymer with a first polyester, wherein the first polyester does not chemically react with the phosphonate compound within the residence time of the plastic processing step, and with an additive that initiates a chemical reaction between the phosphonate compound and the polyester; subjecting the blend to a compounder; and heating the blend to a temperature of about 200° C. to about 300° C., wherein the blend has a sintering temperature of at least about 120° C.

Some embodiments provide an article of manufacture comprising: a blend having a phosphonate oligomer or polymer, a first polyester, wherein the first polyester has chemically reacted with the phosphonate oligomer or polymer. In some embodiments, the blend further comprises a second polyester that does not chemically react with the phosphonate component with the residence time of the plastic processing steps. In some embodiments, the blend has >30 wt % of the phosphonate compound and a sintering temperature of at least about 120° C. In some embodiments, the article is a film that contains >10 wt % of the phosphonate compound, wherein the film has a % Haze of maximum 10. In some embodiments the article is a fiber that contains >2 wt % of the phosphonate component.

Some embodiments provide a polymer composition comprising a blend of a phosphonate oligomer or polymer; and a polyester which chemically reacts with the phosphonate oligomer or polymer within the residence time of the plastic processing step that is used to make the polymer composition.

In some embodiments, the polymer composition displays a signal of $^{13}C$ NMR at 121 ppm.

In some embodiments, the integration of the signal of $^{13}C$ NMR at 121 ppm gives a value of at least greater than 0.1 when the integral of a signal at about 128 ppm representing the main chain aromatic ester of a phosphonate oligomer or polymer is set to 100.

In some embodiments, the polymer displays a signal of $^{31}P$ NMR at 24 to 28 ppm corresponding to a structure of main chain aromatic ester of a phosphonate oligomer or polymer with an integral reduced to less than 99% compared to external standard phosphonate material In some embodiments, the polymer displays signals of $^{31}P$ NMR at 38 to 60 ppm with greater than 0.1%.

In some embodiments, the polyester is virgin polyester or recycled polyester.

In some embodiments, the polymer composition contains at least 30 wt % of a phosphonate oligomer of polymer and has a maximum no sintering temperature of at least about 120° C.

In some embodiments, the polymer composition contains at least 30 wt % of a phosphonate oligomer of polymer and has a maximum no sintering temperature of at least about 150° C.

In some embodiments, the polymer composition contains at least 40 wt % of a phosphonate oligomer of polymer and has a maximum no sintering temperature of at least about 120° C.

In some embodiments, the polymer composition contains at least 40 wt % of a phosphonate oligomer of polymer and has a maximum no sintering temperature of at least about 150° C.

In some embodiments, the blend further comprises a second polyester, wherein the second polyester does not chemically react with the phosphonate oligomer or polymer during the residence time of the plastic processing step.

In some embodiments, the polyester has an IV of about 0.7 to about 0.9 and a crystallization temperature Tc, as measured during cooling at 40° C./min, of greater than 150° C.

In some embodiments, the polyester has an IV of about 0.7 to about 0.9 and a crystallization temperature Tc, as measured during cooling at 40° C./min, of greater than 170° C.

In some embodiments, the first polyester comprises at least about 0.5% weight of the composition.

In some embodiments, the polymer composition has a higher viscosity than the expected average viscosity of all polyesters in the blend.

In some embodiments, the phosphonate oligomer or polymer comprises greater than about 2 wt % of the polymer composition.

In some embodiments, the polymer composition has a lower haze than for a blend of a phosphonate oligomer or polymer and a polyester that does not react with the phosphonate oligomer or polymer.

In some embodiments, the phosphonate oligomer or polymer comprises greater than about 2 wt % of the composition.

In some embodiments, the polyphosphonate has the formula:

wherein:
Ar is an aromatic group;
X is a $C_{1-20}$ alkyl, $C_{2-20}$ alkene, $C_{2-20}$ alkyne, $C_{5-20}$ cycloalkyl, or $C_{6-20}$ aryl; and
n is in a range from about 2 to about 100,
or a salt or a solvate thereof.

In some embodiments, the polyphosphonate has the formula:

Some embodiments provide a polymer composition comprising a blend of a phosphonate oligomer or polymer; a polyester which does not chemically react with the phosphonate oligomer or polymer within the residence time of the plastic processing step that is used to make the polymer composition; and an additive that promotes and initiates the reaction between the polyester and the phosphonate compound within the residence time of the plastic processing step that is used to make the polymer composition.

In some embodiments, the additive is a polymerization catalyst that is used in making polyesters or a nucleating agent.

In some embodiments, the additive is one or more of the following: sodium acetate, sodium carbonate, disodium terephthalate, trisodium phosphate. sodium antimonate, sodium montanate, sodium benzoate, sodium phenyl phosphinate, sodium isobutyl phosphinate, or the sodium complex of phthalocyanine.

In some embodiments, the additive is one or more of the following: tin chloride dihydrate, butylstannoic acid, di-n-butyloxo-stannane, modified di-n-butyl-oxo-stannane, dibutyltindilaurate, titanium tetrabutylate, cobalt acetate, diantimony trioxide, antimony dicarboxylate, antimony potassium tartrate In some embodiments, the amount of the nucleating agent is 0.001 wt % to 0.4 wt %

Some embodiments provide a method for making a polymer blend comprising mixing >30 wt % of a phosphonate oligomer or polymer with a polyester, wherein the polyester reacts with the phosphonate oligomer or polymer within the residence time of the compounding step to yield a blend; subjecting the blend to a compounder; and heating the blend to a temperature of about 200° C. to about 300° C., wherein the blend has a sintering temperature of at least about 120° C.

In some embodiments, the mixing of the phosphonate oligomer or polymer with the polyester further comprises mixing with a second polyester wherein the second polyester does not react with the phosphonate oligomer or polymer within the residence time of the compounding step.

Some embodiments provide an article of manufacture comprising a blend having a phosphonate oligomer or polymer, and a polyester, wherein the polyester has reacted with the phosphonate oligomer or polymer.

In some embodiments, the blend further comprises a second polyester that does not react with the phosphonate oligomer or polymer within the residence time of the thermal processing step.

In some embodiments, the blend has at least 30 wt % of the phosphonate oligomer or polymer and has a sintering temperature of at least about 120° C.

In some embodiments, the article is a film, wherein the film has a % Haze of maximum 10.

In some embodiments, the article is a fiber wherein the blend has at least 2 wt % of the phosphonate oligomer or polymer.

DETAILED DESCRIPTION

Before the present compositions and methods are described, it is to be understood that they are not limited to the particular compositions, methodologies or protocols described, as these may vary. It is also to be understood that the terminology used in the description is for the purpose of describing the particular versions or embodiments only, and is not intended to limit their scope which will be limited only by the appended claims.

It must also be noted that as used herein and in the appended claims, the singular forms "a," "an," and "the" include plural reference unless the context clearly dictates otherwise. Unless defined otherwise, all technical and scientific terms used herein have the same meanings as commonly understood by one of ordinary skill in the art. Although any methods and materials similar or equivalent to those described herein can be used in the practice or testing of embodiments disclosed, the preferred methods, devices, and materials are now described.

"Optional" or "optionally" means that the subsequently described event or circumstance may or may not occur, and that the description includes instances where the event occurs and instances where it does not.

"Substantially no" means that the subsequently described event may occur at most less than about 10% of the time or the subsequently described component may be at most about less than 10% of the total composition, in some embodiments, and in others, at most about less than 5%, and in still others at most about less than 1%.

The term "alkyl" or "alkyl group" refers to a branched or unbranched hydrocarbon or group of 1 to 20 carbon atoms, such as but not limited to methyl, ethyl, n-propyl, isopropyl, n-butyl, isobutyl, t-butyl, octyl, decyl, tetradecyl, hexadecyl, eicosyl, tetracosyl and the like. "Cycloalkyl" or "cycloalkyl groups" are branched or unbranched hydrocarbons in which all or some of the carbons are arranged in a ring, such as but not limited to cyclopentyl, cyclohexyl, methylcyclohexyl and the like. The term "lower alkyl" includes an alkyl group of 1 to 10 carbon atoms.

The term "aryl" or "aryl group" refers to monovalent aromatic hydrocarbon radicals or groups consisting of one or more fused rings in which at least one ring is aromatic in nature. Aryls may include but are not limited to phenyl, naphthyl, biphenyl ring systems and the like. The aryl group may be unsubstituted or substituted with a variety of substituents including, but not limited to, alkyl, alkenyl, halide, benzylic, alkyl or aromatic ether, nitro, cyano and the like and combinations thereof.

"Substituent" refers to a molecular group that replaces a hydrogen in a compound and may include, but is not limited to, trifluoromethyl, nitro, cyano, $C_1$-$C_{20}$ alkyl, aromatic or aryl, halide (F, Cl, Br, I), $C_1$-$C_{20}$ alkyl ether, benzyl halide, benzyl ether, aromatic or aryl ether, hydroxy, alkoxy, amino, alkylamino (—NHR'), dialkylamino (—NR'R") or other groups which do not interfere with the formation of the diaryl alkylphosphonate.

As defined herein, an "arylol" or an "arylol group" is an aryl group with a hydroxyl, OH, group substituent on the aryl ring. Non-limiting examples of an arylol are phenol, naphthalenol and the like. A wide variety of arlyols may be used in the embodiments of the invention and are commercially available.

The term "alkanol" or "alkanol group" refers to a compound including an alkyl of 1 to 20 carbon atoms or more having at least one hydroxyl group substituent. Examples of alkanols include but are not limited to methanol, ethanol, 1- and 2-propanol, 1,1-dimethylethanol, hexanol, octanol and the like. Alkanol groups may be optionally substituted with substituents as described above.

The term "alkenol" or "alkenol group" refers to a compound including an alkene of 2 to 20 carbon atoms or more having at least one hydroxyl group substituent. The hydroxyl may be arranged in either isomeric configuration (cis or trans). Alkenols may be further substituted with one or more substituents as described above and may be used in place of alkanols in some embodiments of the invention. Alkenols are known to those skilled in the art and many are readily available commercially.

The terms "flame retardant," "flame resistant," "fire resistant," or "fire resistance," as used herein, means that the composition exhibits a limiting oxygen index (LOI) of at least 27. "Flame retardant," "flame resistant," "fire resistant," or "fire resistance," may also be tested by measuring the after-burning time in accordance with the UL test (Subject 94). In this test, the tested materials are given classifications of UL-94 V-0, UL-94 V-1 and UL-94 V-2 on the basis of the results obtained with the ten test specimens. Briefly, the criteria for each of these UL-94-V-classifications are as follows:

UL-94 V-0: the total flaming combustion for each specimen after removal of the ignition flame should not exceed 10 seconds and the total flaming combustion for 5 specimens should not exceed 50 seconds. None of the test specimens should release any drips which ignite absorbent cotton wool.

UL-94 V-1: the total flaming combustion for each specimen after removal of the ignition flame should not exceed 30 seconds and the total flaming combustion for 5 specimens should not exceed 250 seconds. None of the test specimens should release any drips which ignite absorbent cotton wool.

UL-94 V-2: the total flaming combustion for each specimen after removal of the ignition flame should not exceed 30 seconds and the total flaming combustion for 5 specimens should not exceed 250 seconds. Test specimens may release flaming particles, which ignite absorbent cotton wool.

Fire resistance may also be tested by measuring afterburning time. These test methods provide a laboratory test procedure for measuring and comparing the surface flammability of materials when exposed to a prescribed level of radiant heat energy to measure the surface flammability of materials when exposed to fire. The test is conducted using small specimens that are representative, to the extent possible, of the material or assembly being evaluated. The rate at which flames travel along surfaces depends upon the physical and thermal properties of the material, product or assembly under test, the specimen mounting method and orientation, the type and level of fire or heat exposure, the availability of air, and properties of the surrounding enclosure. If different test conditions are substituted or the end-use conditions are changed, it may not always be possible by or from this test to predict changes in the fire-test-response characteristics measured. Therefore, the results are valid only for the fire test exposure conditions described in this procedure.

The state-of-the-art approach to rendering polymers flame retardant is to use additives such as brominated compounds or compounds containing aluminum and/or phosphorus. Use of the additives with polymer can have a deleterious effect on the processing characteristics and/or the mechanical performance of articles produced from them. In addition, some of these compounds are toxic, and can leach into the environment over time making their use less desirable. In some countries, certain brominated additives are being phased-out of use because of environmental concerns.

"Molecular weight," as used herein, is the weight average molecular weight determined by gel permeation chromatography (GPC) relative to polystyrene standards. GPC provides information about the molecular weight and molecular weight distribution of a polymer. It is known that the molecular weight distribution of a polymer is important to properties such as thermo-oxidative stability (due to different amount of end groups), toughness, melt flow, and fire resistance, for example, low molecular weight polymers drip more when burned.

Polymer blending represents a very important field in the development of new materials, which could potentially provide better properties in comparison with the net polymers. When different polymers are blended, various types of blends are made depending on the miscibility of the polymers:

1. Immiscible polymer blends: In this type of heterogeneous polymer blend, glass transition temperatures (Tg) of the individual polymers will be observed. That is, two or more distinct Tg.

2. Compatible polymer blends: Immiscible but compatible polymer blends will observe multiple Tgs. The immiscible polymer blend exhibits macroscopically uniform physical properties, which are usually caused by sufficiently strong interactions between the component polymers. That is, two or more distinct Tg.

3. Miscible polymer blends: In thermodynamics, this is a single-phase homogeneous polymer blend at molecular level. In pragmatic sense miscibility means the system appears to be homogeneous in the type of test used for study, i.e. it is defined in the terms of degree of dispersion. In this case, one glass transition temperature will be observed. That is, a single Tg.

Most polymer blends are immiscible systems, whose properties are not only a function of material parameters (i.e. blend composition, viscosity ratio, elasticity ratio and interfacial tension), but also depend on processing conditions (i.e. temperature, time, and intensity of mixing). Material parameters and processing conditions determine the size, shape and distribution of one phase into the other resulting in different end properties. Many polymer pairs are not only immiscible but also incompatible, which means that they show high interfacial tension that leads to rough phase structure, poor adhesion at the interface, and therefore poor mechanical properties. Compatibility arises from thermodynamic interaction between the blend constituents, which is a function of their physical and chemical structure. The main reasons that lead to creating incompatible systems are the absence of any specific interaction between their blend constituents, dissimilarity in their structure, and broad differences in their viscosities.

Mixing of immiscible polymers generates blends that have very poor mechanical properties, exhibit the Tg of each polymer (i.e. two or more Tg), and often produce a rough surface. For improved performance, the blends usually need compatibilization. Compatibilization is a physical or chemical process of modification of interfacial properties, resulting in formation of the interphase and stabilization of the desired morphology. To improve the compatibility between two immiscible components, a third component is often added as a compatibilizer. The compatibilizer can be either premade or in situ formed during melt blending. Compatibilization technologies by using compatibilization agents or by reacting polymers at interface (i.e. reactive processing) have been widely used to make immiscible polymers compatible and reduce the size of the dispersed phase. The dimensions of the dispersed polymer phase in a compatibilized blend can be reduced below visual wavelength, i.e. from about 390 to 750 nm, which could make the blend of two immiscible transparent polymers transparent. A common method for testing for compatibility of a polymer blend is to determine whether multiple $T_g$s due to the constituent polymers are detected in the blend. The existence of one Tg of the blend indicates miscibility, while presence of two Tg in the original position is an evidence of a completely immiscible blend. If two Tg are found, and that they are shifted toward each other from the value of the components, the blend is termed partially miscible. Fox equation is commonly applied to predict the glass transition temperature in miscible polymer blends:

$$\frac{1}{T_g} = \frac{x_1}{T_{g,1}} + \frac{1-x_1}{T_{g,2}}$$

where $X_1$ is the weight fraction of polymer component 1.

Although Tg measurement is very useful, it is not an unequivocal measure of blend compatibility, since the detection of the Tg of a given blend component also depends on the concentration of the polymer in the blend and separation of the Tg values of the components. Depending on the capability and methods of analysis, Tg might not be detected when the concentration of the component polymer is below 10-15%. One of the methods to measure Tg as used herein is Differential Scanning calorimeter (DSC). Besides, the compatibility of blends is also probed by other dynamic techniques such as dynamic mechanical (thermomechanical analysis TMA) and dielectric analysis. These techniques are sensitive to approximately 10 nm in domain size.

Polyphosphonates, including the homopolyphosphonate and poly(phosphonate-co-carbonate) with varying percentages of carbonate monomers, are a new family of flame retardant polymers. They can be melt-blended with other thermoplastic polymers to render flame retardancy to the polymer blends. The properties of such blends are also affected by the miscibility between the polymer components. For example, polyphosphonates are transparent polymers. Polyethylene terephthalate (PET), in its amorphous state or as biaxially oriented PET film, has excellent clarity. The biaxially-oriented films made from the blends of polyphosphonates and PET are hazy if not compatibilized, but transparent if compatibilized.

Polyphosphonates derived from diphenyl methylphosphonate and bisphenol A generally exhibit a Tg of about 105° C., which causes pellets of these materials to soften at temperatures greater than 105° C. and stick together, i.e. sinter. These materials are generally dried at a temperature below Tg, typically between about 80° C. and about 95° C. PET is a semi-crystalline polyester with a melt temperature of about 255° C. and can be dried at much higher temperatures. To make PET and polyphosphonate blends, both of the polymers need to be thoroughly dried before melt processing. In such methods, the components can be dried in separate dryers before combining. However, before being fed to the extruder, PET is dried at about 120° C. to 150° C., which is above the Tg of polyphosphonates. When these two polymers contact each other at the feeding line of the extruder, they can stick together, forming lumps and causing pressure fluctuation and/or obstruction of feeding line. In addition, in a single screw extruder (SSE) polyphosphate polymers may get to a molten stage too early and cause lubrication at barrel surface before PET gets a chance to melt. In SSE, a polymer, as solid or melt, moves down the screw channel by the forces exerted on the polymer by the rotating screw and the stationary barrel. The stationary barrel gives a breaking force to the rotating polymer and makes the polymer slip slightly on the screw surface. The polymer still rotates with the screw rubbing on the barrel surface, but at a slightly lower speed than the screw, because of the slippage. The slippage of the polymer on the screw surface along the screw channel results in an output rate. A lubricated screw surface increases the output rate, but a lubricated barrel surface detrimentally reduces the output rate (Extrusion of Polymers. Theory & Practice. 2nd Edition. Chan I. Chung. ISBNs. 978-1-56990-459-6. 1-56990-459-6. HANSER). Complete stoppage of output has been observed in some cases when PET and polyphosphonates were fed together into an SSE that had a general purpose screw design.

Many factors have been studied in an effort to achieve adequate feeding, mixing, and desired throughput of blends of polyesters and polyphosphonates in an SSE, including the ratio of polyphosphonates and the polyester, the use of compatibilizer, as well as the optimization of compounding parameters (such as screw speed, processing temperature and time). The addition of polyesters that have the capacity to chemically react with polyphosphonates within the time frame of the thermoplastic melt process employed (film or fiber extrusion, blow molding, compounding), as described herein, has an unexpected effect on raising the sintering temperature of a blend of a polyester and a polyphosphonate without the need to use compatibilizers. Surprisingly, as low as 0.5 wt % of such a polyester can be added to have this effect. Alternatively, a blend of polyester and a phosphonate oligomer or polymer can be made where all of the polyester consists of the polyester that can react with the phosphonate compound resulting in a blend with up to 95 wt % of polyester.

As used herein, "chemically react" includes, but is not limited to, chain extension, where the end groups of either the phosphonate compound or the end groups of the polyester chain react with the other compound. Additionally, chain transesterification can take place where repeating units inside the chains of each compound can react together forming tow chains that are both composed of a polyester portion and a phosphonate portion. Optionally, these reactions can be catalyzed by an additive like (residual) catalyst, a nucleating agent, or other.

Embodiments of the invention are directed to compositions containing polyphosphonates, including, but not limited to the homopolyphosphonate and copoly (phosphonate carbonate) with varying percentages of carbonate monomers, and polyesters to produce flame retardant polymer blends. In certain embodiments, the composition may be a masterbatch (MB), i.e. a concentrated mixture of a polyphosphonate in a thermoplastic resin that can be incorporated into other polymer compositions to impart flame retardancy on the polymer composition. Other embodiments are directed to methods for making such compositions and articles of manufacture containing these compositions.

The polyesters may be any polyester known in the art including, for example and without limitation, poly(butylene terephthalate) (PBT), poly(ethylene terephthalate) (PET), poly(trimethylene terephthalate) (PTT), poly(ethylene naphthalate) (PEN), or any combination of these, and in certain embodiments, the polyester may be a poly(ethylene terephthalate) (PET) or blend of polyethylene terephthalates (PETs). In various embodiments, the polyester has the capacity for a chemical reaction with phosphonates and may exhibit the following characteristics:

(i) intrinsic viscosity (IV) greater than about 0.7; and
(ii) crystallization exothermal peak great than 160° C. when cooled at 40° C./min from melt or the polyester is fully crytallized during cooling from melt and there is no recrystallization peak when further heating up. DSC is used to determine the relative crystallization rate of a polyester by measuring the crystallization exothermal peak upon cooling of the polymer from the melt. Since the crystallization exothermal peak is dependent on the cooling rate, the rate of crystallization for two different polyesters needs to be compared at the same cooling rate. High cooling rates such as 40° C./min. should be applied to simulate the processing conditions during thermoplastic processing like film blow molding, injection molding, or extrusion.

Monofilament grade polyester, with an IV about 0.8 to about 0.9 and fast crystallization when cooling at 40° C./min from 280° C., is an example of a polyester that can have the capacity to chemically react with phosphonate polymers and oligomers.

Such polyesters may undergo sufficient reaction to produce a compatibilized blend, when compounded with phosphonate polymers or oligomers in extruder with melt temperature (greater than 270° C.), and the blend may exhibit a single Tg. Some PETs may need higher melt temperature and longer melt time to produce a miscible blend with the phosphonate compounds.

Nuclear magnetic resonance spectroscopy (NMR) can determine the new structure formed from phosphonates chemically reacting with polyesters. The characteristic signals can be detected with $^{13}$C NMR, $^{31}$P NMR, or both $^{13}$C NMR and $^{31}$P NMR. In particular, a new signal in a $^{13}$C NMR spectrum may appear in the aromatic region between about 120 and about 122 ppm representing the aromatic ester of a phosphonate chain end that is chemically attached to a carbonyl group of PET. The quantification of the signal representing the aromatic ester of a phosphonate chain end chemically attached to a carbonyl group of PET is achieved by accurate integration of the signal at 121 ppm. The integral may be greater than 0.1 when the integral of a signal at about 128 ppm representing the main chain aromatic ester of a phosphonate is set to 100.

$^{31}$P NMR displays characteristic peaks corresponding to the aromatic phosphonate structure. One of main signals at 24 to 28 ppm may reduce the peak intensity and new peaks appear in the range of 38 to 60 ppm that are representing the phosphonate chain end chemically attached to a carbonyl group of PET or ethylene glycol group of PET. The degree of reactions that the aromatic phosphonate is chemically bonded to PET may be determined by how much integral of the main signal at 24 to 28 ppm has been reduced and how much integrals of the new signals in the range of 38 to 60 ppm have been created. The quantification of the degree of reaction may be achieved by internal or external calibration that a defined amount of a reference material containing phosphorus species is added to the sample solution. The integral of the aromatic phosphonate that is chemically bonded to PET may be lesser than 99%. The integral of the signals at 38 to 60 ppm may be greater than 0.1%.

The compositions of embodiments can include any amount of phosphonate oligomer or polymer and in certain embodiments, the compositions may include greater than about 40 wt. % phosphonate, or greater than about 45 wt. % phosphonate or about 35 wt. % to about 70 wt. %, 40 wt. % to about 60 wt. %, about 45 wt. % to about 55 wt. %, or any range or individual concentration encompassed by these example ranges. The compositions of such embodiments may exhibit a sintering temperature of, for example and without limitation, greater than 100° C., greater than 120° C., or greater than or equal to 150° C., or greater than 100° C. to about 150° C., about 120° C. to about 150° C., or any range or individual concentration encompassed by these example ranges

Depending on the actual composition of the phosphonates, the phosphorus content of the phosphonate polymers, copolymers, or oligomers can vary from 2 up to 20 wt %. Thus, the phosphorus content in the blends may be greater than about 0.2 wt % and as high as about 14 wt %.

In certain embodiments, the phosphonate may be a homopolymer, copolymer (such as a copoly(phosphonate ester) or copoly(phosphonate carbonate)), or a phosphonate oligomer such as those described and claimed in U.S. Pat. Nos. 6,861,499, 7,816,486, 7,645,850, 7,838,604, 8,530,044, 8,563,638, 8,648,163, 8,779,041, and 9,745,424, each of which are hereby incorporated by reference in their entireties, or their respective oligomers. Briefly, such polymers and oligomers may include repeating units derived from diaryl alkyl- or diaryl arylphosphonates. For example, in some embodiments, such polyphosphonates or phosphonate oligomers may have a structure including:

where Ar is an aromatic group and —O—Ar—O— may be derived from a compound having one or more, optionally substituted, aryl rings such as, but not limited to, resorcinols, hydroquinones, and bisphenols, such as bisphenol A, bisphenol F, and 4,4'-biphenol, phenolphthalein and its derivatives, 4,4'-thiodiphenol, 4,4'-sulfonyldiphenol, or combinations of these, X is a $C_{1-20}$ alkyl, $C_{2-20}$ alkene, $C_{2-20}$ alkyne, $C_{5-20}$ cycloalkyl, or $C_{6-20}$ aryl, and n is an integer from 2 to about 100, 2 to about 75, or 2 to about 50, or any integer between these ranges.

In particular embodiments, Ar may be bisphenol A, and X may be a methyl group providing polyphosphonates or their respective oligomers. These may have structures such as, but not limited to and combinations thereof, where n, is equal or greater than about 2.

The weight average molecular weight (Mw) of each of the one or more phosphonate containing polymers and in particular embodiments, the polyphosphonates can range from about 10,000 g/mole to about 150,000 g/mole measured against polystyrene (PS) standards. The Mw of the oligomeric phosphonates can range from about 1,000 g/mole to about 10,000 g/mole measured against PS standards, and in some embodiments, the Mw can range from about 2,000 g/mole to about 6,000 g/mole measured against PS standards.

Some embodiments provide polymer compositions comprising a blend of a phosphonate oligomer or polymer; and a polyester that does not chemically react with the phosphonate compound within the residence time of the plastic processing step and an additive (e.g. (catalysts, nucleating agents) that initiates the chemical reaction between the phosphonate compound and the polyester.

In some embodiments, the compositions may include additional additives that improve one or more properties of the composition such as, for example, color. Non-limiting examples of such additional additives include fillers, dyes, antioxidants, pigments, anti-dripping agents, wetting agents, lubricating agents, and the like and combinations thereof. In particular embodiments, the composition may include a dye and/or pigment. The compositions may further include additional fire resistant additives such as, but not limited to, metal hydroxides, nitrogen containing flame retardants such as melamine cyanurate, phosphinate salts, organic phosphates, other phosphonates, organic sulfonate salts, siloxanes, and the like and combinations thereof.

EXAMPLES

Although the present invention has been described in considerable detail with reference to certain preferred embodiments thereof, other versions are possible. Therefore, the spirit and scope of the appended claims should not be limited to the description and the preferred versions contained within this specification. Various aspects of the present invention will be illustrated with reference to the following non-limiting examples.

Materials
PET-1—Polyethylene Terephthalate (PET) with IV of 1.1
PET-2—Polyethylene Terephthalate (PET) with IV of 1.05
PET-3—Polyethylene Terephthalate (PET) with IV of 0.89
PET-4—Polyethylene Terephthalate (PET) with IV of 0.6
PET-5—Polyethylene Terephthalate (PET) with IV of 0.89
PET-6—Polyethylene Terephthalate (PET) with IV of 0.89
rPET—recycled PET with IV of 0.72
Licomont® NaV 101—Sodium salt of montanic acids by Clariant The properties of the PETs above are summarized in Table 1.

Compounding

A 27 millimeters twin screw extruder (TSE) was used to compound a variety of compositions of PET and polyphosphonates. The temperature for the extruder started at 200° C. at the feeding block, and the subsequent zones were set at various temperatures to study their effect on the blend, for example, from 260° C. to 290° C. Compounding was conducted at 10-15 kgs/hour with a screw speed of 100-250 rpm. All ingredients were pre-dried and mixed before putting into the feed hopper.

MVR:

Melt Volume-Flow Rate (MVR) was measured on Dynisco LMI 4000 Melt Indexer.

Sintering Temperature Measurement

1. Set the moisture analyzer (Sartorius Mark 3) temperature at 150° C.;
2. Spread out on the moisture analyzer pan with a thin layer of compounded pellets (amorphous);
3. Wait until the pellets turn translucent (a few minutes) then break up the sintered pellets;
4. Set the moisture analyzer temperature at 110° C. (or other temperatures of interest);
5. Add the pellets from step 3 to the pan (try to pile them up, not spread out);
6. Wait for 20 minutes; and
7. Observe whether the pellets are sintered; and If not, go back to step 4, increases the temperature, repeat step 4-7, until sintering is observed.

The temperature at which no sintering happens and which is about 10° C. below the temperature where sintering does happen is called maximum no sintering temperature (MNST). For example, if pellets do not stick together at 150° C. but show sticking behavior at 160° C., the MNST is defined as 150° C. MNST is used throughout discussions below as a measurement of sintering temperature.

NMR was measured on Varian Unity Inova 500 at 25° C. in mixture of d-chloroform/trifluoracetic acid.

Characterization of PET by DSC

Four PET materials were characterized using DSC. The materials were heated at a rate of 10° C./min to 280° C. After keeping the sample at this temperature for 1 minute, the temperature of the sample was decreased at a rate of 40° C./min to 30° C. The crystallization peaks were determined during the cooling cycle (40° C./min from 280° C. to 30° C.). Subsequently, the samples were heated again for a second time at a rate of 10° C./min. DSC properties of four PET samples are displayed below in TABLE 1.

TABLE 1

DSC Properties of PET Samples

| | | 1st heating (10° C./min) | | | | Cooling (40° C./min) | | 2nd Heating (10° C./min) | | | | |
|---|---|---|---|---|---|---|---|---|---|---|---|---|
| | | Tg, ° C. | $T_{RC}$, ° C. | $\Delta H_{RC}$, J/g PET | Tm, ° C. | $\Delta H_m$, J/g PET | Tc, ° C. | $\Delta H_c$, J/g PET | Tg, ° C. | $T_{RC}$, ° C. | $\Delta H_{RC}$, J/g PET | Tm, ° C. peak | $\Delta H_m$, J/g PET |
| PET-1 | IV = 1.1 | 80 | — | — | 250 | 37 | 147 | 1 | 82 | 157 | 17 | 253 | 20 |
| PET-2 | IV = 1.05 | 82 | — | — | 252 | 51 | 145 | 3 | 83 | 164 | 24 | 257 | 28 |
| PET-3 | IV = 0.89 | 81 | — | — | 261 | 59 | 182 | 38 | 84 | — | — | 257 | 35 |
| PET-4 | IV = 0.6 | 81 | — | — | 258 | 34 | 172 | 40 | 83 | — | — | 256 | 41 |
| PET-5 | IV = 0.89 | 85 | | | 249 | 54 | — | — | 82 | 176 | 24 | 256 | 32 |
| PET-6 | IV = 0.89 | 77 | | | 256 | 63 | 179 | 35 | 84 | — | — | 257 | 37 |
| PET-7 | IV = 0.63 | 73 | 125 | 27 | 262 | 40 | 157 | 29 | 80 | 147 | 4 | 257 | 43 |
| rPET | IV = 0.72 | 87 | — | — | 255 | 25 | 161 | 32 | 81 | — | — | 250 | 37 |

The different PET grades can be differentiated by their IV and by their rate of crystallization, characterized by the ΔHc measured in the cooling cycle. PET-1 and PET-2 are materials with a relatively high IV but with a low crystallization rate (low ΔHc). PET-4 is a material with a relatively low IV and a high crystallization rate. Finally, PET 3 has an intermediate IV but a high crystallization rate. PET-5 and PET-6 are from the same manufacturer with similar IV but different rate of crystallization.

Comparative Example 1

55 wt % of PET-1 and 45 wt % of polyphosphonate (Nofia HM1100, FRX Polymers) were compounded with a 27 millimeters TSE. The compounding conditions and resulting MVR and sintering temperature are listed in TABLE 2. Additionally, there was no peak observed at 121 ppm in the $^{13}$C NMR spectrum of the compounded blend.

Example 1

55 wt % of PET-3 and 45 wt % of polyphosphonate (Nofia HM1100, FRX Polymers) were compounded at the same conditions as COMPARATIVE EXAMPLE 1. Condition and results are listed in TABLE 2.

TABLE 2

PET/Polyphosphonate Blends

|  | Comparative Example 1 | Example 1 |
|---|---|---|
| PET, PET-1 | 55.0% |  |
| PET, PET-3 |  | 55.0% |
| Nofia HM1100 | 45.0% | 45.0% |
| Compounding Temp, ° C. | 275-265 | 260-270 |
| Screw speed, rpm | 100 | 100 |
| Torque, % | 50 | 60 |
| MVR [290° C./1.2 kg/300 sec], ml/10 min | 17 | 15 |
| Max. No Sintering Temperature (MNST), ° C. | 100 | >150 |

Surprisingly, very different sintering temperatures were observed. The blend with PET-3 showed a much higher sintering temperature than the blend with PET-1. $^{13}$C NMR of the blend from EXAMPLE 1 showed a peak at 121 ppm and the integrated peak area was 0.98 with the area at 128 ppm set to 100. $^{31}$P NMR of the blend from EXAMPLE 1 displayed a main signal at 27.8 ppm with 96.1% of integral compared to a calibrant. Nofia HM1100 was used as an external calibrant. The NMR results indicate that the phosphonate structure was chemically connected to the PET structure. Thus, the fact that the PET could react with the phosphonate compound, enhanced the MNST.

Comparative Examples 2-4

Effect of Screw Speed

The same composition as in COMPARATIVE EXAMPLE 1 was prepared with extruder temperatures set from 265 to 260° C. (second zone to die) and varying screw speed from 100 rpm to 250 rpm. The results are listed in TABLE 3. The screw speed does not change the sintering temperature and there was no peak observed at 121 ppm in the $^{13}$C NMR spectra of COMPARATIVE EXAMPLES 2 to 4. $^{31}$P NMR of the blend from COMPARATIVE EXAMPLE 2 to 4 displayed a main signal at 27.8 ppm with greater than 99.0% of integral compared to a calibrant.

TABLE 3

PET/Polyphosphonate Blends, Effect of screw speed

|  | COMPARATIVE EXAMPLE 2 | COMPARATIVE EXAMPLE 3 | COMPARATIVE EXAMPLE 4 |
|---|---|---|---|
| PET, PET-1 | 55.0% | 55.0% | 55.0% |
| Nofia HM1100 | 45.0% | 45.0% | 45.0% |
| Compounding Temp [° C.] | 265-260 | 265-260 | 265-260 |
| Screw speed, rpm | 100 | 200 | 250 |
| Torque, % | 50 | 54 | 56 |
| MVR (290 C./1.2 kg/ 300 sec), ml/10 min | 19 | 21 | 22 |
| Max. No Sintering Temperature (MNST), ° C. | 100 | 100 | 100 |

Comparative Examples 5-7

The blend prepared in COMPARATIVE EXAMPLE 1 was recompounded at 275 to 265° C. with varying screw speeds from 100 rpm to 250 rpm. The results are listed in TABLE 4. The sintering temperature did not change and no peak was observed at 121 ppm in the $^{13}$C NMR spectrum of COMPARATIVE EXAMPLES 5 to 7. $^{31}$P NMR of the blend from COMPARATIVE EXAMPLE 5 to 7 displayed a main signal at 27.8 ppm with greater than 99.0% of integral compared to a calibrant.

TABLE 4

PET/Polyphosphonate Blends, Effect of Second Pass and Screw Speed

|  | COMPARATIVE EXAMPLE 1 | COMPARATIVE EXAMPLE 5 | COMPARATIVE EXAMPLE 6 | COMPARATIVE EXAMPLE 7 |
|---|---|---|---|---|
| PET, PET-1 | 55.0% |  |  |  |
| Nofia HM1100 | 45.0% |  |  |  |
| COMPARATIVE EXAMPLE 1 |  | 100% | 100% | 100% |
| Compounding Temp[° C.] | 275-265 | 275-265 | 275-265 | 275-265 |
| Screw speed, rpm | 100 | 100 | 150 | 200 |
| Torque, % | 50 | 40 | 43 | 44 |
| MVR (290 C./1.2 kg/300 sec), ml/10 min | 17 | 23 | 22 | 22 |
| Max. No Sintering Temperature (MNST), ° C. | 100 | 100 | 100 | 100 |

Examples 2-3

The loading of polyphosphonates affects the sintering temperature of the blends. The lower the polyphosphonate loading, the higher the sintering temperature as shown in TABLE 5.

TABLE 5

PET/Polyphosphonate Blends - Effect of Polyphosphonate Loading

|  | COMPARATIVE EXAMPLE 1 | EXAMPLE 2 | EXAMPLE 3 |
|---|---|---|---|
| PET, PET-1 | 55.0% | 60.0% | 70% |
| Nofia HM1100 | 45.0% | 40.0% | 30% |
| Max. No Sintering Temperature (MNST), ° C. | 100 | 110 | 150 |

Comparative Examples 8-10

Compatibilizing the polyester phase with the phosphonate portion of the blend using additional compatibilizers could possibly lead to an improved MNST. Therefore a known compatibilization agent such as Joncryl 4400 was added to the blend of PET and polyphosphonate (TABLE 6). The addition of the compatibilizer Joncryl 4400 slightly increased the sintering temperature but stayed well below 150° C. However, the MVR of the blends was greatly reduced, which also made the blends unusable for further plastic processing.

TABLE 6

PET/Polyphosphonate Blends - Effect of Compatibilizer

|  | COMPARATIVE EXAMPLE 2 | COMPARATIVE EXAMPLE 8 | COMPARATIVE EXAMPLE 9 | EXAMPLE 2 | COMPARATIVE EXAMPLE 10 |
|---|---|---|---|---|---|
| PET, PET-1 | 55.0% | 54.75% | 54.5% | 60% | 59.62% |
| Nofia HM1100 | 45.0% | 45.0% | 45.0% | 40% | 40% |
| Joncryl 4400 |  | 0.25% | 0.5% |  | 0.38% |
| Compounding temperature [° C.] | 265-260 | 265-260 | 265-260 | 265-260 | 285-280 |
| MVR (290 C./1.2 kg/300 sec), ml/10 min | 19 | 6.5 | Cannot be measured | 16 | Cannot be measured |
| Max. No Sintering Temperature (MNST), ° C. | 100 | 100 | 120 | 110 | 130 |

Comparative Examples 11-12

The reaction between polyesters and phosphonate compounds can possibly be enhanced by increasing the temperature during compounding. Therefore a blend consisting of PET and a polyphosphonate was compounded at increasing temperatures that are representative for the range of typical processing temperatures for PET (TABLE 7). The data show that the compounding temperatures in the range studied had no effect on sintering temperature.

TABLE 7

PET/Polyphosphonate Blends - Effect of Compounding Temperature

|  | COMPARATIVE EXAMPLE 2 | COMPARATIVE EXAMPLE 11 | COMPARATIVE EXAMPLE 12 |
|---|---|---|---|
| PET, PET-1 | 55.0% | 55.0% | 55.0% |
| Nofia HM1100 | 45.0% | 45.0% | 45.0% |
| Compounding Temp [° C.] | 265-260 | 275-265 | 285-280 |
| Screw speed, rpm | 100 | 100 | 100 |
| Torque, % | 50 | 53 | 39 |
| Max. No Sintering Temperature (MNST), ° C. | 100 | 100 | 100 |

Examples 4-6, 8

To determine whether it was possible to use a PET that can react with phosphonate materials can enhance the MNST of a PET blend with phosphonates that under normal compounding circumstances does not react with phosphonates, different blends of PET-1, PET-3 and polyphosphonates were made (Table 8). Adding as low as 5 wt % of PET-3 to a blend of PET-1 and polyphosphonate using the same compounding conditions, the sintering temperature of the blend was dramatically increased from 100° C. to over 150° C. The MVR was also decreased to a value lower than what would have been expected based on the content and the MVR of the individual components, indicating the occurrence of a reaction. The blend still showed two Tgs but the Tgs moved closer to each other, which again indicated that a chemical reaction had taken place. Having a lower overall MVR, but not too low to prevent further plastic processing of the blend, can be advantageous for applications requiring good mechanical performance. In the current examples, to achieve a low desired MVR/flow while maintaining a high MNST, there may be an optimal loading of PET-3, such as, 5-10 wt %. 13C NMR of the blend from EXAMPLE 6 showed the peak at 121 ppm and the integrated peak area was 1.06 with the peak at 128 ppm set at 100, which indeed indicated that polyphosphonate had reacted with PET. The blend made in COMPARATIVE EXAMPLE 14 did not show the peak at 121 ppm. In another case, when using PET-5 to make 45% Nofia HM1100 blend with only 100° C. of MNST (Comparative EXAMPLE 13), the addition of 2.5% of PET-6 increased the MNST to greater than 150 C (EXAMPLE 8).

These data show that not only the MNST of polyester blends with high levels of phosphonates can be improved by allowing a reaction between a polyester and the phosphonate compound but that also the properties of articles made from blends with lower levels of phosphonates can be enhanced (e.g. optical properties of films like higher transparency or lower haze) by enabling a reaction between the polyester and the phosphonate component.

Another possible application of these surprising findings is the use of small amounts (e.g. about 1 to about 2 wt %) of a phosphonate compound in blends of two or more polyesters with relatively low viscosities to increase the overall viscosity of the polyester blend that can show improved properties for different applications.

TABLE 8

PET/Polyphosphonate Blends-Effect of Addition of PET-3, PET-6

|  | Comparative EXAMPLE 12 | EXAMPLE 4 | EXAMPLE 5 | EXAMPLE 6 | Comparative EXAMPLE 13 | EXAMPLE 8 |
|---|---|---|---|---|---|---|
| PET, PET-1 (IV 1.1) | 55.0% | 50.0% | 45.0% | 40.0% | | |
| PET, PET-3 (IV 0.89) | | 5.0% | 10.0% | 15.0% | | |
| PET, PET-5 (IV 0.89) | | | | | 55.0% | 52.5% |
| PET, PET-6 (IV 0.89) | | | | | | 2.5% |
| Nofia HM1100 | 45.0% | 45.0% | 45.0% | 45.0% | 45.0 | 45% |
| Compounding temperature [° C.] | 285-280 | 285-280 | 285-280 | 285-280 | 260-275 | 260-275 |
| MVR (290 C/1.2 kg/300 sec), ml/10 min | 28 | 12 | 12 | 18 | 30 | 18 |
| Max. No Sintering Temperature (MNST), ° C. | 100 | >150 | >150 | >150 | 100 | >150 |
| Tg, C (2$^{nd}$ heating) | 83/104 | 83/101 | 84/99 | 85/101 | | |

Figure 1:
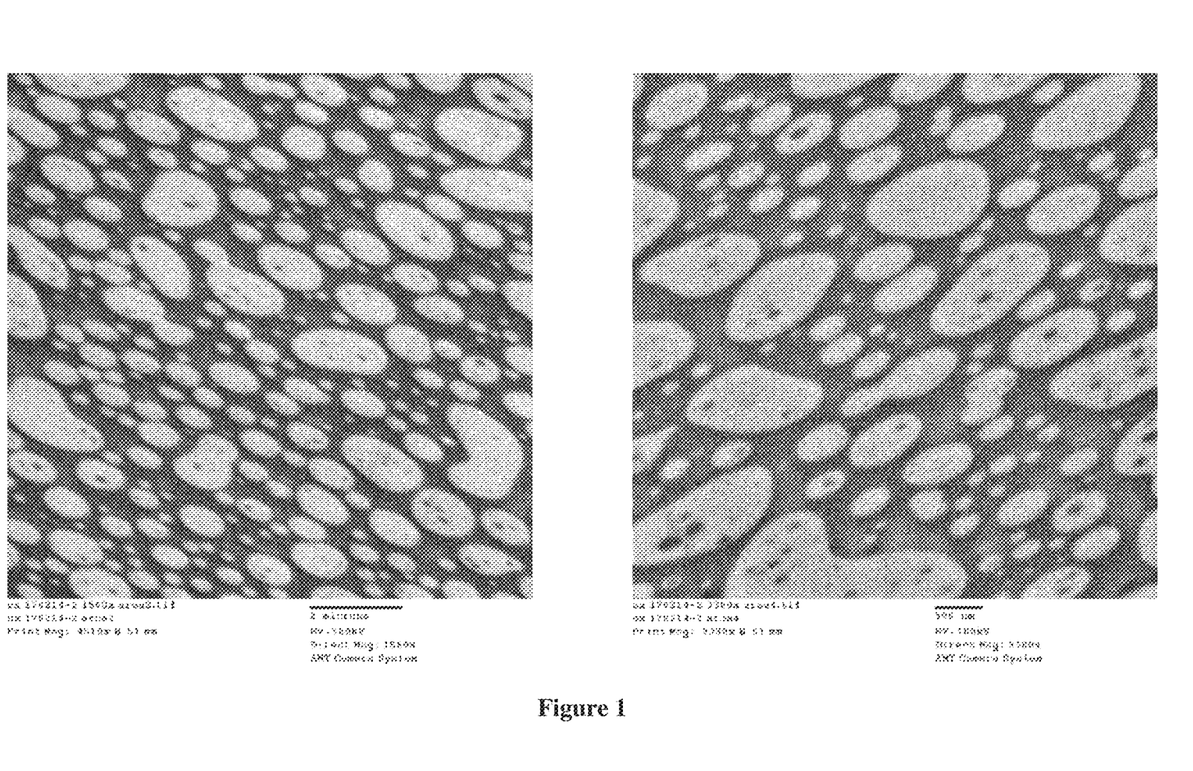
FIG. 1 depicts TEM micrographs of Comparative Example 14. PET phase (light) is dispersed as spherical particulates in a continuous phase of Nofia HM1100 (dark). (magnification 1560×, left; 3300×, right)
Figure 2:
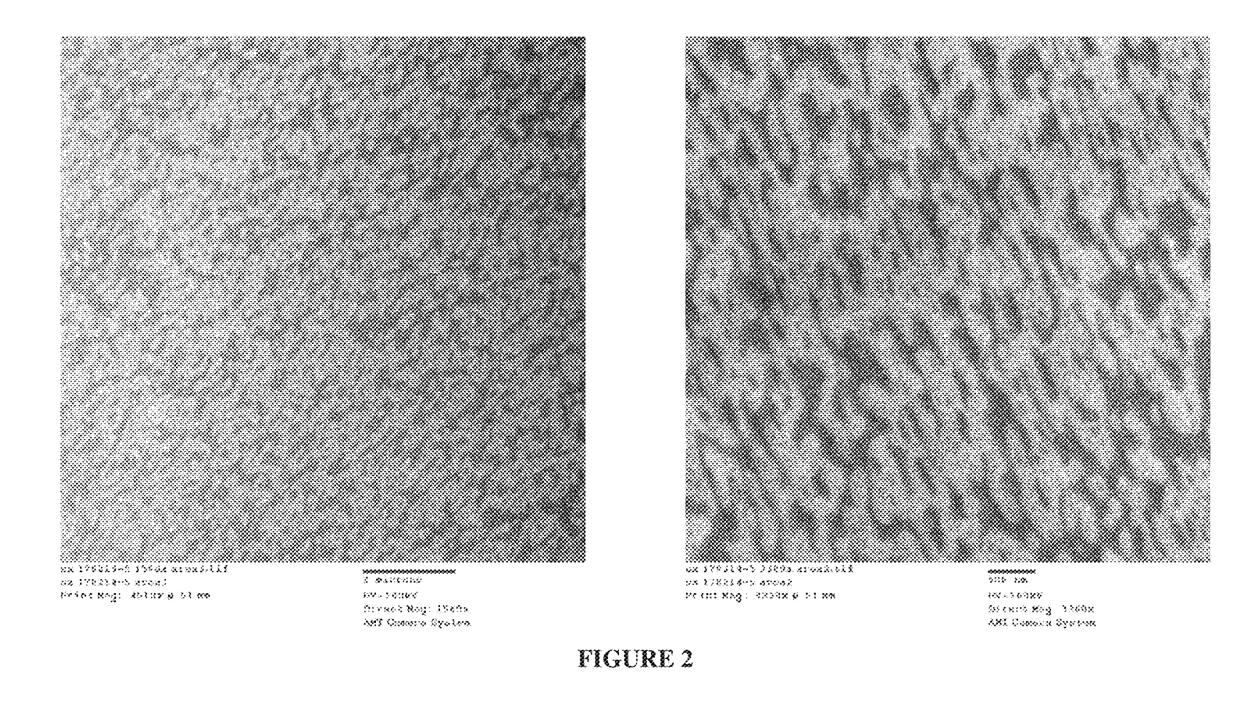
FIG. 2 depicts TEM micrographs of Example 6. The morphology shows co-continuous structure. (magnification 1560×, left; 3300×, right)
Figure 3:
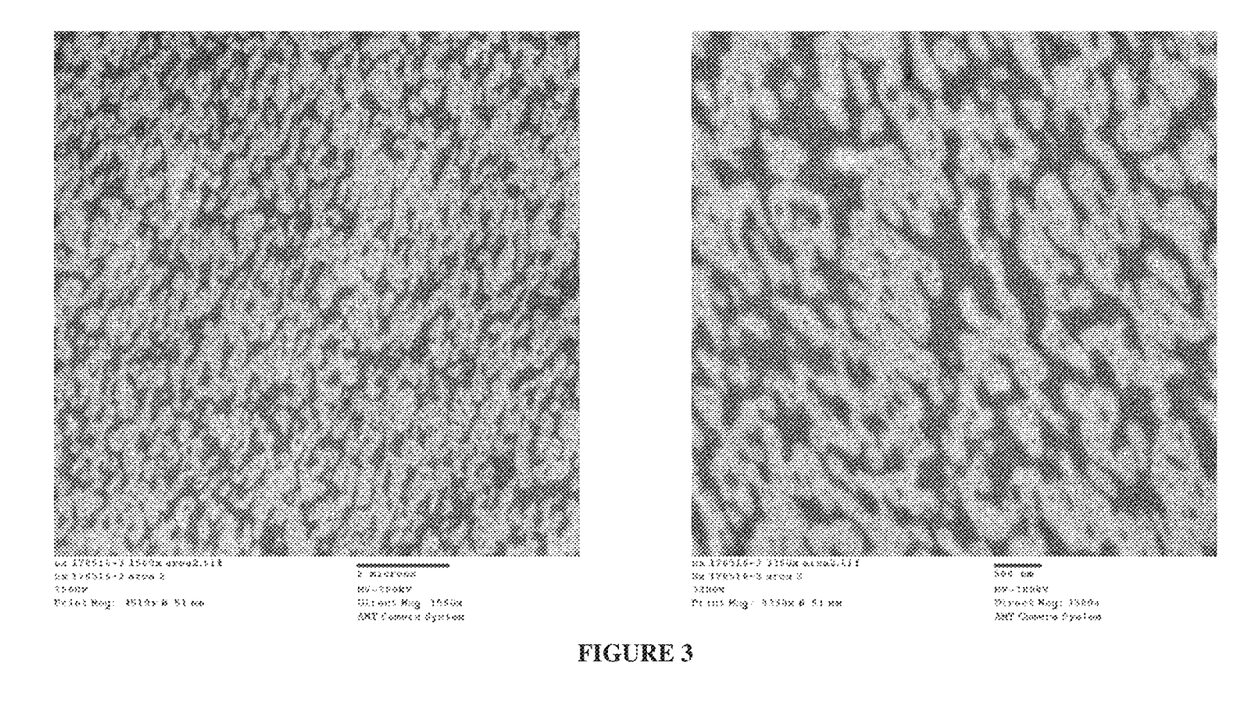
FIG. 3—TEM micrographs of Example 1. The morphology shows co-continuous structure. (magnification 1560×, left; 3300×, right)

Transmission Electron Microscopy (TEM) images of Comparative Example 14 (see FIG. 1) showed that the PET phase (light) is dispersed as spherical particulates in a continuous phase of Nofia HM1100 (dark), which led to the low MNST. Surprisingly, TEM micrographs Example 6 (see FIG. 2) show a co-continuous structure of both phases, which most likely has led to the high MNST of 150° C. A similar morphology was also observed for material from Example 1 (see FIG. 3)

Comparative Example 13

85 wt % of PET-4 and 15% of polyphosphonate (Nofia HM1100, FRX Polymers) was compounded using a sheet extruder and made to films by biaxial orientation. The resulting transparency and haze are listed in TABLE 9.

Example 7

18% of PET-3 and 67% of PET-4 and 15% of polyphosphonate (Nofia HM1100, FRX Polymers) were compounded using a sheet extruder and made to films by biaxial orientation. The resulting transparency haze are listed in TABLE 9. $^{13}$C NMR showed the peak at 121 ppm and the integrated peak areas were 0.34 when the peak at 128 ppm was set at 100, which indicates that the polyphosphonate was chemically attached to the PET. The $^{13}$C NMR spectrum of the blend from COMPARATIVE EXAMPLE 15 only showed the peak at 128 ppm but no peak was observed at 121 ppm.

TABLE 9

PET/Polyphosphonate Blends

|  | Comparative Example 13 | Example 7 |
|---|---|---|
| PET, PET-3 | | 18% |
| PET, PET-4 | 85.0% | 67.0% |
| Nofia HM1100 | 15.0% | 15.0% |
| Transparency | 85 | 90 |
| Haze | 34 | 6 |

Example 9

Licomont® NaV 101, a sodium salt of montanic acids, acts as a suitable nucleating agent in PET and PBT. It also has outstanding lubrication and mold-release effects. When it was added at very low loading of 0.1% to the PET/Nofia HM1100 MB as shown in Table 10, the MNST of the MB was increased from only 100 C to great than 150 C, and only one Tg was observed of the blend, indicating the accelerated reaction between PET and polyphosphonates.

TABLE 10

|  | Comparative EXAMPLE 14 | Example 8 | Example 9 |
|---|---|---|---|
| PET, PET-5 | 55% | 52.5% | 54.9% |
| PET, PET-6 | | 3% | |
| Nofia HM1100 | 45% | 45% | 45% |
| Licomont NAV 101 | | | 0.1% |
| Compounding temperature [° C.] | | 260-275 C. | |
| MVR @280 C./1.2 Kg/300 sec, ml/10 min | 30 | 15 | 50 |
| Max. No Sintering Temperature (MNST), ° C. | 100 | >150 C. | >150 C. |
| Tg, C | 83/104 | 83/102 | 85 |

Examples 10-12

Figure 4:
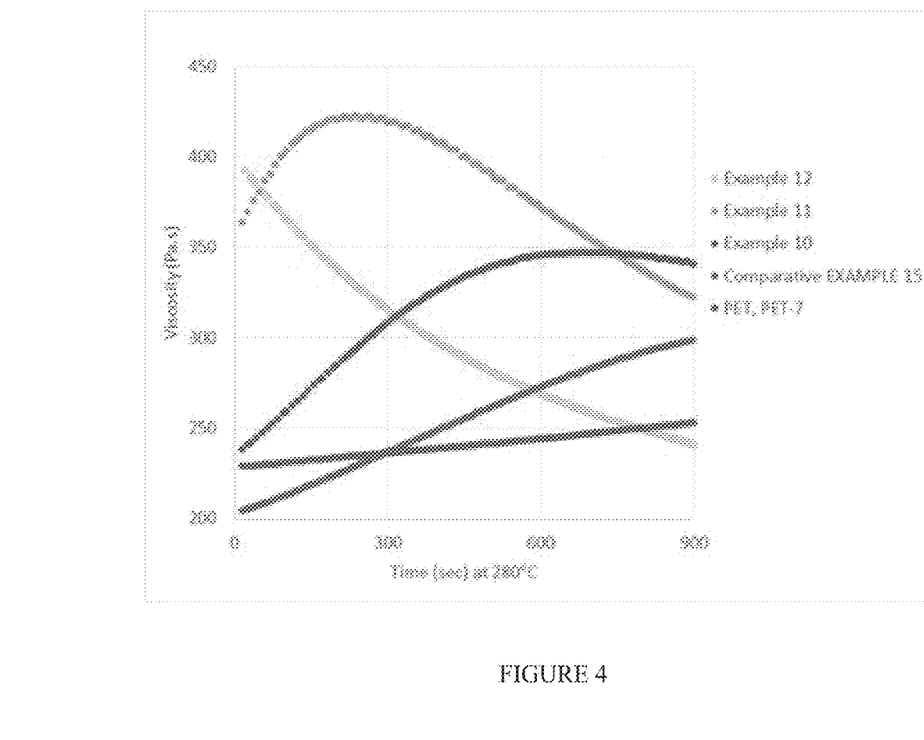
FIG. 4. Is a graph showing a Rheology Time Sweep at 280 C of PET/Nofia polyphosphonate blends with additives.

Table 11 presents a few compositions where PET-6 or Licomont NaV 101 were added to a PET/Nofia blends with much lower Nofia polyphosphonate content at 7%. FIG. 4 shows the rheology time sweep of these blends in comparison to the virgin PET, PET-7. As can be seen, both of the additives greatly increased the reaction between PET and Nofia blends. The loading of Licomont NaV 101 could be further reduced to get to same reactivity as 3% of PET-6. The loading of both additives could be optimized to tailor to individual processing lines according to their time, temperature, melt pressure or other constraints.

TABLE 11

|  | Comparative EXAMPLE 15 | Example 10 | Example 11 | Example 12 |
|---|---|---|---|---|
| PET, PET-7 | 93% | 92% | 90% | 92.967% |
| Nofia HM1100 | 7% | 7% | 7% | 7% |
| PET, PET-6 |  |  | 1% | 3% |
| Licomont NaV 101 |  |  |  | 0.033% |
| Compounding Temperature [° C.] | 200/260/275/275/275/265/265/265 | | | |
| MVR 280 C./1.2 Kg/ 300 s, ml/10 min | 46 | 35 | 25 | NA |

See FIG. 4.

Example 13

Recycled PETs react well with Nofia polyphosphonate. Without any additive to further promote the reaction, rPET/Nofia HM1100 showed significant viscosity increase, as shown in FIG. 5.

TABLE 12

|  | Comparative EXAMPLE 16 | Example 13 |
|---|---|---|
| PET, rPET | 100 | 94.5 |
| Nofia HM1100 |  | 5.5 |
| Compounding Temperature [° C.] | 200/265/285/275/275/275/275/275 | |

Figure 5:
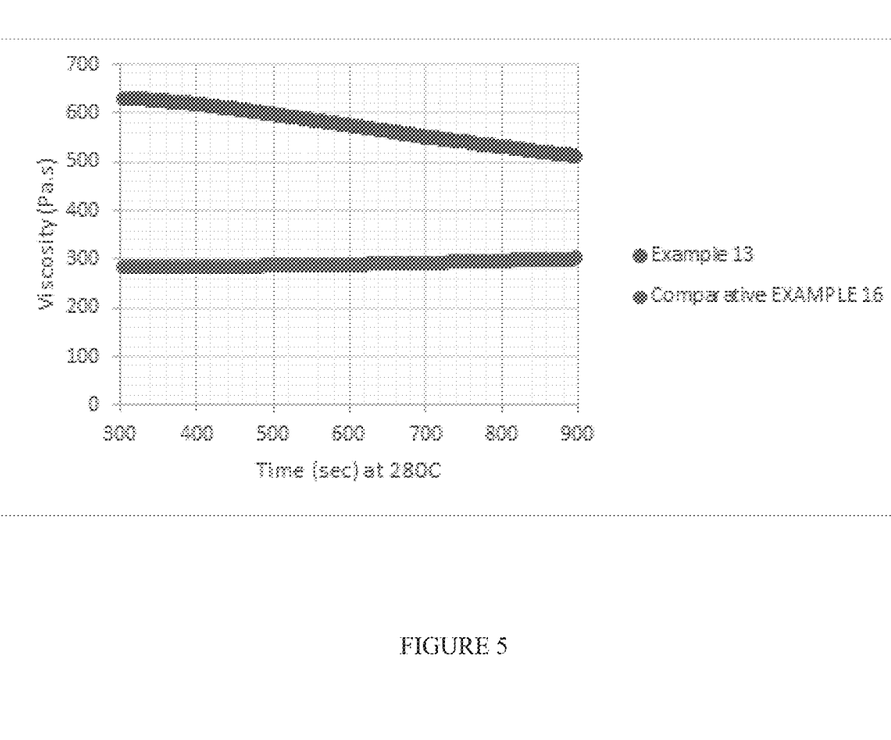
FIG. 5. Is a graph showing Rheology Time Sweep for recycled PET and its Nofia polyphosphonate blend.

See FIG. 5.

What is claimed is:

1. A polymer composition comprising: a blend of
   a phosphonate oligomer or polymer; and
   a polyester which chemically reacts with the phosphonate oligomer or polymer within the residence time of the plastic processing step that is used to make the polymer composition.

2. The polymer composition of claim 1 wherein the polymer composition displays a signal of $^{13}$C NMR at 121 ppm.

3. The polymer composition of claim 2 wherein the integration of the signal of nc NMR at 121 ppm gives a value of at least greater than 0.1 when the integral of a signal at about 128 ppm representing the main chain aromatic ester of a phosphonate oligomer or polymer is set to 100.

4. The polymer composition of claim 1 wherein the polymer displays a signal of $^{31}$P NMR at 24 to 28 ppm corresponding to a structure of main chain aromatic ester of a phosphonate oligomer or polymer with an integral reduced to less than 99% compared to external standard phosphonate material.

5. The polymer composition of claim 4, wherein the polymer displays signals of $^{31}$P NMR at 38 to 60 ppm with greater than 0.1%.

6. The polymer composition of claim 1, wherein the polyester is virgin polyester or recycled polyester.

7. The polymer composition of claim 1 wherein the polymer composition contains at least 30 wt % of a phosphonate oligomer of polymer and has a maximum no sintering temperature of at least about 120° C.

8. The polymer composition of claim 1 wherein the polymer composition contains at least 30 wt % of a phosphonate oligomer of polymer and has a maximum no sintering temperature of at least about 150° C.

9. The polymer composition of claim 1 wherein the polymer composition contains at least 40 wt % of a phosphonate oligomer of polymer and has a maximum no sintering temperature of at least about 120° C.

10. The polymer composition of claim 1 wherein the polymer composition contains at least 40 wt % of a phosphonate oligomer of polymer and has a maximum no sintering temperature of at least about 150° C.

11. The polymer composition of claim 1, wherein the blend further comprises a second polyester, wherein the second polyester does not chemically react with the phosphonate oligomer or polymer during the residence time of the plastic processing step.

12. The polymer of claim 1, wherein the polyester has an IV of about 0.7 to about 0.9 and a crystallization temperature Tc, as measured during cooling at 40° C./min, of greater than 150° C.

13. The polymer of claim 1, wherein the polyester has an IV of about 0.7 to about 0.9 and a crystallization temperature Tc, as measured during cooling at 40° C./min, of greater than 170° C.

14. The composition of claim 1, wherein the first polyester comprises at least about 0.5% weight of the composition.

15. The polymer composition of claim 1, wherein the polymer composition has a higher viscosity than the expected average viscosity of all polyesters in the blend.

16. The polymer composition of claim 1, wherein the phosphonate oligomer or polymer comprises greater than about 2 wt % of the polymer composition.

17. The polymer composition of claim 1, wherein the polymer composition has a lower haze than for a blend of a phosphonate oligomer or polymer and a polyester that does not react with the phosphonate oligomer or polymer.

18. The composition of claim 17, wherein the phosphonate oligomer or polymer comprises greater than about 2 wt % of the composition.

19. The composition of claim 1, wherein the polyphosphonate has the formula:

wherein:
   Ar is an aromatic group;
   X is a C1-20 alkyl, C2-20 alkene, C2-20 alkyne, Cs-20 cycloalkyl, or C6-20 aryl; and n is in a range from about 2 to about 100,
or a salt or a solvate thereof.

20. The composition of claim 19, wherein the polyphosphonate has the formula:

21. A polymer composition comprising: a blend of
a phosphonate oligomer or polymer;
a polyester which does not chemically react with the phosphonate oligomer or polymer within the residence time of the plastic processing step that is used to make the polymer composition; and
an additive that promotes and initiates the reaction between the polyester and the phosphonate compound within the residence time of the plastic processing step that is used to make the polymer composition.

22. A polymer composition of claim 21, wherein the additive is a polymerization catalyst that is used in making polyesters or a nucleating agent.

23. A polymer composition of claim 21, wherein the additive is one or more of the following: sodium acetate, sodium carbonate, disodium terephthalate, trisodium phosphate, sodium antimonate, sodium montanate, sodium benzoate, sodium phenyl phosphinate, sodium isobutyl phosphinate, or the sodium complex of phthalocyanine.

24. A polymer composition of claim 21, wherein the additive is one or more of the following: tin chloride dihydrate, butylstannoic acid, di-n-butyloxo-stannane, modified di-n-butyl-oxo-stannane, dibutyltindilaurate, titanium tetrabutylate, cobalt acetate, diantimony trioxide, antimony dicarboxylate, antimony potassium tartrate.

25. The polymer composition of claim 21, wherein the amount of the nucleating agent is 0.001 wt % to 0.4 wt %.

26. A method for making a polymer blend comprising:
mixing >30 wt % of a phosphonate oligomer or polymer with a polyester, wherein the polyester reacts with the phosphonate oligomer or polymer within the residence time of the compounding step to yield a blend;
subjecting the blend to a compounder; and
heating the blend to a temperature of about 200° C. to about 300° C., wherein the blend has a sintering temperature of at least about 120° C.

27. The method of claim 26, wherein the mixing of the phosphonate oligomer or polymer with the polyester further comprises mixing with a second polyester wherein the second polyester does not react with the phosphonate oligomer or polymer within the residence time of the compounding step.

28. An article of manufacture comprising:
a blend having a phosphonate oligomer or polymer, and a polyester,
wherein the polyester has reacted with the phosphonate oligomer or polymer.

29. The article of manufacture of claim 28, wherein the blend further comprises a second polyester that does not react with the phosphonate oligomer or polymer within the residence time of the thermal processing step.

30. The article of claim 29, wherein the blend has at least 30 wt % of the phosphonate oligomer or polymer and has a sintering temperature of at least about 120° C.

31. The article of claim 29 being a film, wherein the film has a % Haze of maximum 10.

32. The article of claim 29, being a fiber wherein the blend has at least 2 wt % of the phosphonate oligomer or polymer.

* * * * *